United States Patent
Gopal et al.

(10) Patent No.: US 10,334,558 B2
(45) Date of Patent: Jun. 25, 2019

(54) PERSISTENT PAGING COLLISION ENHANCEMENT USING DYNAMICALLY SWITCHED HIGHER-ORDER ANTENNAS IN IDLE-MODE

(71) Applicant: QUALCOMM Incorporated, San Diego, CA (US)

(72) Inventors: Thawatt Gopal, San Diego, CA (US); Tom Chin, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/958,592

(22) Filed: Apr. 20, 2018

(65) Prior Publication Data

US 2018/0368098 A1 Dec. 20, 2018

Related U.S. Application Data

(60) Provisional application No. 62/520,425, filed on Jun. 15, 2017.

(51) Int. Cl.
*H04W 68/02* (2009.01)
*H04W 72/04* (2009.01)
(Continued)

(52) U.S. Cl.
CPC ........... *H04W 68/02* (2013.01); *H04W 72/06* (2013.01); *H04W 76/15* (2018.02);
(Continued)

(58) Field of Classification Search
CPC ..... H04W 68/02; H04W 72/06; H04W 76/15; H04W 74/0858; H04W 88/06; H04W 72/0453
See application file for complete search history.

(56) References Cited

U.S. PATENT DOCUMENTS 8,958,324 B2 * 2/2015 Chin ..................... H04W 68/02
370/252
9,326,268 B2 * 4/2016 Xia ..................... H04W 68/005
(Continued)

FOREIGN PATENT DOCUMENTS

WO WO-2011056253 A1 5/2011
WO WO-2013023120 A1 2/2013
(Continued)

OTHER PUBLICATIONS

International Search Report and Written Opinion—PCT/US2018/028878—ISA/EPO—dated Jun. 22, 2018.

*Primary Examiner* — Brandon J Miller
(74) *Attorney, Agent, or Firm* — Holland & Hart LLP

(57) ABSTRACT

Methods, systems, and devices for wireless communications are described. A wireless device may detect a collision of paging messages for a first subscription and a second subscription of the wireless device during a paging processing duration, the first receive chain including at least one antenna path. The wireless device may determine that, in a connected mode, it is configured to operate a second receive chain with one or more additional antenna paths, and may allocate, for a subsequent instance of the paging processing duration, the first subscription to one of the first receive chain or the second receive chain, and the second subscription to the other of the first receive chain or the second receive chain. The wireless device may monitor, during the subsequent instance of the paging processing duration, for a first paging message and a second paging message using the first and second receive chains.

30 Claims, 9 Drawing Sheets

(51) Int. Cl.
    *H04W 72/06*     (2009.01)
    *H04W 74/08*     (2009.01)
    *H04W 76/15*     (2018.01)
    *H04W 88/06*     (2009.01)

(52) U.S. Cl.
    CPC .... *H04W 72/0453* (2013.01); *H04W 74/0858* (2013.01); *H04W 88/06* (2013.01)

(56) References Cited

U.S. PATENT DOCUMENTS

| | | | |
|---|---|---|---|
| 9,504,055 B1* | 11/2016 | Sanka | H04W 72/12 |
| 2012/0257494 A1* | 10/2012 | Chin | H04W 36/0027 |
| | | | 370/221 |
| 2013/0090137 A1 | 4/2013 | Krishnamoorthy et al. | |
| 2013/0150105 A1* | 6/2013 | Clevorn | H04W 48/12 |
| | | | 455/501 |
| 2013/0201890 A1* | 8/2013 | Swaminathan | H04W 88/06 |
| | | | 370/311 |
| 2015/0119343 A1 | 4/2015 | Prockop et al. | |
| 2015/0163827 A1* | 6/2015 | Ekici | H04W 68/02 |
| | | | 370/338 |
| 2016/0134317 A1* | 5/2016 | Hu | H04B 1/3816 |
| | | | 455/558 |

FOREIGN PATENT DOCUMENTS

| | | |
|---|---|---|
| WO | WO-2016118331 A1 | 7/2016 |
| WO | WO-2016133671 A1 | 8/2016 |

\* cited by examiner

PERSISTENT PAGING COLLISION ENHANCEMENT USING DYNAMICALLY SWITCHED HIGHER-ORDER ANTENNAS IN IDLE-MODE

CROSS REFERENCES

The present Application for Patent claims priority to U.S. Provisional Patent Application No. 62/520,425 by Gopal et al., entitled "Persistent Paging Collision Enhancement Using Dynamically Switched Higher-Order Antennas in Idle Mode," filed Jun. 15, 2017, assigned to the assignee hereof, and which is hereby expressly incorporated by reference herein in its entirety.

BACKGROUND

The following relates generally to wireless communication, and more specifically to persistent paging collision enhancement using dynamically switched higher order antennas in idle mode.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

When a base station has information to transmit to a UE, the base station may transmit a paging message to prompt the UE to enter a connected state to receive the information. In some cases, a UE may have the capability of supporting multiple wireless services or subscriptions (e.g., radio access technologies (RATs), or subscriber identification modules (SIMs), etc.). Each of the multiple subscriptions supported by the UE may be associated with a different paging occasion or wakeup time during a reception time interval. In some instances, the UE may wake up for a paging occasion for each of the multiple subscriptions. In some such instances, conventional solutions for processing pages may be deficient.

SUMMARY

The described techniques relate to improved methods, systems, devices, or apparatuses that support persistent paging collision enhancement using dynamically switched higher order antennas in idle mode. A wireless device such as a user equipment (UE) may support multiple wireless services such as multi-subscriber identification module (multi-SIM) Long Term Evolution (LTE) or multi-SIM LTE-Wideband Code Division Multiple Access (WCDMA), and may operate in an idle mode to conserve power. The idle mode may be, for example, a discontinuous receive (DRX) mode. In the DRX mode, the UE may periodically wake up during a paging processing duration to monitor one or more channels to determine whether paging information is available for the UE. In some cases, the UE may operate in a single-receive chain during idle mode to conserve power, and thus may not support dual concurrent receive paths on primary and diversity antennas for each subscription. Furthermore, each wireless service may be associated with a different wakeup occasion and in some cases, the wakeup occasions or pages for two wireless services may collide. In some circumstances, a page processing duration for one subscription (e.g., a first LTE subscription) may overlap or collide with a page processing duration of another wireless subscription (e.g., a second LTE subscription, or a WCDMA subscription). Due to limited receive capabilities of a single receive chain of the UE in idle mode, collisions between paging signals transmitted for each of the subscriptions may occur, and a single receive chain of the UE in idle mode may be unable to successfully monitor and receive pages for each subscription within the same frequency band or frequency band group. Thus, paging performance for the UE may be adversely impacted.

To overcome these and other issues, a UE as described herein may determine whether alternative antenna receive paths associated with a second (or additional) receive chain are available to receive paging messages using the same frequency band or frequency band group as the single receive chain. The determination may be based in part on the antenna configuration and antenna capabilities of the UE. For example, in some cases, there may be alternative antenna paths in addition to the primary and/or diversity antenna paths for a UE supporting Higher Order Receive Diversity (HORxD), 4x4 Multiple Input Multiple Output (MIMO), or both, when in connected mode on certain frequency bands. The UE in idle mode may concurrently use the first and second receive chains to receive pages for each of the subscriptions, thereby improving paging performance.

In some examples, the UE may employ a dynamic decision making process by estimating or calculating a performance metric for each subscription on at least one antenna path for each receive chain. In such cases, the UE may then allocate each subscription to at least one antenna path of a receive chain, based in part on the performance metrics. Such techniques may allow for a UE to utilize one or more higher order antennas to achieve dual-receive chain concurrency during multi-SIM page demodulation.

A method of wireless communications is described. The method may include detecting, using a first receive chain of a UE in an idle mode operating in at least one frequency band, a collision of paging messages for a first subscription and a second subscription of the UE during a paging processing duration, the first receive chain including at least one antenna path, determining that, in a connected mode, the UE is configured to operate a second receive chain with one or more additional antenna paths in the at least one frequency band, allocating, for a subsequent instance of the paging processing duration, the first subscription to one of the first receive chain or the second receive chain, and the second subscription to the other of the first receive chain or the second receive chain, and monitoring, during the subsequent instance of the paging processing duration, for a first paging message and a second paging message using the first and second receive chains.

An apparatus for wireless communications is described. The apparatus may include means for detecting, using a first receive chain of the apparatus in an idle mode operating in at least one frequency band, a collision of paging messages for a first subscription and a second subscription of the UE during a paging processing duration, the first receive chain including at least one antenna path, means for determining that, in a connected mode, the apparatus is configured to operate a second receive chain with one or more additional antenna paths in the at least one frequency band, means for allocating, for a subsequent instance of the paging processing duration, the first subscription to one of the first receive chain or the second receive chain, and the second subscription to the other of the first receive chain or the second receive chain, and means for monitoring, during the subsequent instance of the paging processing duration, for a first paging message and a second paging message using the first and second receive chains.

Another apparatus for wireless communications is described. The apparatus may include a processor, memory in electronic communication with the processor, and instructions stored in the memory. The instructions may be operable to cause the processor to detect, using a first receive chain of a UE in an idle mode operating in at least one frequency band, a collision of paging messages for a first subscription and a second subscription of the UE during a paging processing duration, the first receive chain including at least one antenna path, determine that, in a connected mode, the UE is configured to operate a second receive chain with one or more additional antenna paths in the at least one frequency band, allocate, for a subsequent instance of the paging processing duration, the first subscription to one of the first receive chain or the second receive chain, and the second subscription to the other of the first receive chain or the second receive chain, and monitor, during the subsequent instance of the paging processing duration, for a first paging message and a second paging message using the first and second receive chains.

A non-transitory computer-readable medium for wireless communications is described. The non-transitory computer-readable medium may include instructions operable to cause a processor to detect, using a first receive chain of a UE in an idle mode operating in at least one frequency band, a collision of paging messages for a first subscription and a second subscription of the UE during a paging processing duration, the first receive chain including at least one antenna path, determine that, in a connected mode, the UE is configured to operate a second receive chain with one or more additional antenna paths in the at least one frequency band, allocate, for a subsequent instance of the paging processing duration, the first subscription to one of the first receive chain or the second receive chain, and the second subscription to the other of the first receive chain or the second receive chain, and monitor, during the subsequent instance of the paging processing duration, for a first paging message and a second paging message using the first and second receive chains.

In some examples of the method, apparatus, and non-transitory computer-readable medium described above, the at least one frequency band includes a group of non-contiguous frequency bands.

In some examples of the method, apparatus, and non-transitory computer-readable medium described above, the monitoring further comprises: monitoring at least one antenna path of one of the first receive chain or the second receive chain allocated to the first subscription for the first paging message, and at least one antenna path of the other of the first receive chain or the second receive chain allocated to the second subscription for the second paging message.

In some examples of the method, apparatus, and non-transitory computer-readable medium described above, the allocating further comprises: determining a performance metric for each of the antenna paths for the first receive chain and the second receive chain, wherein the performance metric may be one or more of a Reference Signal Received Power (RSRP), a Received Signal Strength Indicator (RSSI), a Reference Signal Received Quality (RSRQ), a Signal to Noise Ratio (SNR), or a Block Error Rate (BLER).

Some examples of the method, apparatus, and non-transitory computer-readable medium described above may further include processes, features, means, or instructions for ranking the antenna paths for the first receive chain and the second receive chain based at least in part on the determined performance metrics.

In some examples of the method, apparatus, and non-transitory computer-readable medium described above, the allocating may be based at least in part on the ranking.

In some examples of the method, apparatus, and non-transitory computer-readable medium described above, the allocating may be based at least in part on determining that the performance metrics for each of the antenna paths for the first receive chain or the second receive chain do not satisfy a threshold for the first subscription and the second subscription.

In some examples of the method, apparatus, and non-transitory computer-readable medium described above, the allocating may be based at least in part on determining that the performance metrics for each of the antenna paths for the first receive chain and the second receive chain do not satisfy a threshold for one of the first or second subscriptions.

In some examples of the method, apparatus, and non-transitory computer-readable medium described above, the allocating allocates the first subscription to the at least one antenna path on the first receive chain and the second subscription to the one or more additional antenna paths on the second receive chain based at least in part on determining that each of the performance metrics satisfies a threshold.

In some examples of the method, apparatus, and non-transitory computer-readable medium described above, the monitoring further comprises: decoding the first paging message and the second paging message.

Some examples of the method, apparatus, and non-transitory computer-readable medium described above may further include processes, features, means, or instructions for entering a low power mode subsequent to decoding the first paging message and the second paging message. Some examples of the method, apparatus, and non-transitory computer-readable medium described above may further include processes, features, means, or instructions for exiting the low power mode during a next instance of the paging processing duration.

In some examples of the method, apparatus, and non-transitory computer-readable medium described above, the monitoring further comprises: concurrently operating the first receive chain and the second receive chain during the subsequent instance of the paging processing duration.

In some examples of the method, apparatus, and non-transitory computer-readable medium described above, the detecting further comprises: determining that a number of collisions of the paging messages exceeds a threshold.

In some examples of the method, apparatus, and non-transitory computer-readable medium described above, the determining further comprises: determining that the UE supports HORxD, or 4×4 MIMO, or both.

In some examples of the method, apparatus, and non-transitory computer-readable medium described above, the UE supports multiple subscription capabilities, and the first subscription corresponds to a first LTE subscription, and the second subscription corresponds to a second LTE subscription, a WCDMA subscription, or any other 3rd Generation Partnership Project (3GPP) wireless access technology.

In some examples of the method, apparatus, and non-transitory computer-readable medium described above, the determining may be based at least in part on an antenna configuration, antenna capability of the UE, or both.

DETAILED DESCRIPTION

Figure 1:
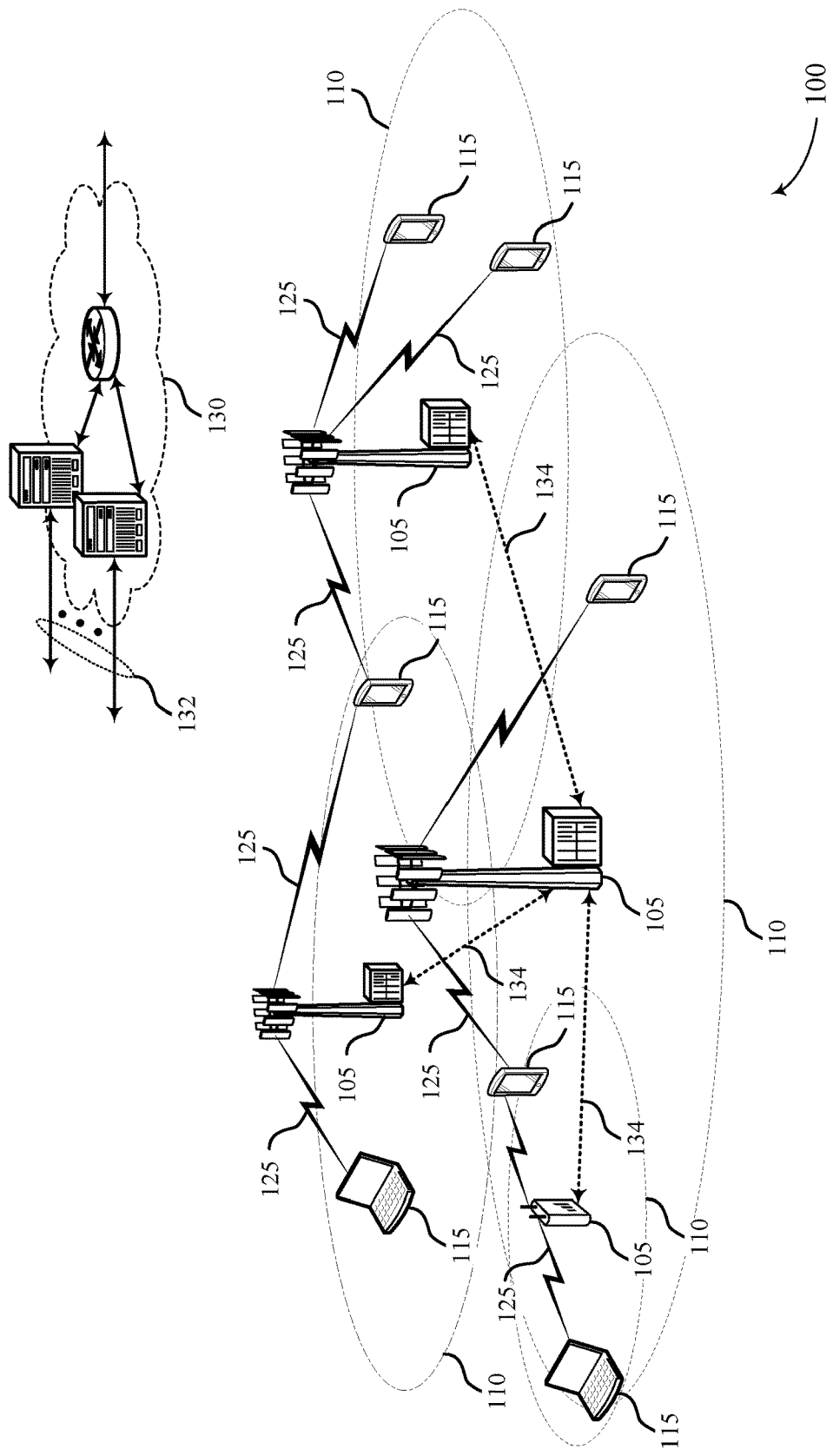
FIG. 1 illustrates an example of a wireless communications system that supports persistent paging collision enhancement using dynamically switched higher-order antennas in idle mode in accordance with aspects of the present disclosure.

In wireless communications systems, a base station may transmit a page or a paging message to a user equipment (UE) in a channel during a particular subframe or set of subframes, which may be referred to as a paging occasion for the UE. In some cases, the UE may support multiple wireless subscriptions such as multi-subscriber identification module (multi-SIM) Long Term Evolution (LTE) or multi-SIM LTE-Wideband Code Division Multiple Access (WCDMA), and may operate in an idle mode, such as a discontinuous reception (DRX) mode, to conserve power. In the DRX mode, the UE may periodically wake up during a DRX interval to monitor one or more channels to determine whether paging information is available for transmission or reception for the UE. When in the idle mode, the UE may utilize primary and diversity antennas for page demodulation and processing of a Master Information Block (MIB), a System Information Block (SIB), or both, if its Radio Frequency (RF) hardware supports the same.

In some cases, the UE may have multiple receive chains but operate only a single receive (Rx) chain when in an idle mode. A UE operating a single receive chain may be capable of supporting multiple wireless services (e.g., LTE-LTE multi-SIM, LTE-WCDMA multi-SIM, etc.). During a DRX interval, however, the UE may only be capable of tuning into or monitoring channels carrying paging messages for a single wireless service. In some instances, paging message for each of multiple wireless services may be sent, in which the UE in idle mode wakes up to receive a page. In some cases, pages of two or more wireless services may be sent in time intervals that at least partially overlap, resulting in a paging collision. For example, a UE with dual subscription (or dual-SIM) may register on two different networks, and pages for the two subscriptions may be sent during the same or similar time interval, thus impacting paging monitoring. In some cases, an LTE subscription 1 and an LTE subscription 2 may have paging cycles of a fixed duration (e.g., 320 ms) or a multiple of the fixed duration (e.g., N*320, where N is an integer). In such cases, there is a certain probability that the paging cycle of each subscription may persistently overlap, resulting in the UE persistently receiving paging messages for each subscription at the same or overlapping times, which may be referred to herein as a paging collision.

In some cases, the UE may support dual-receive concurrency across dual-SIM dual-standby (DR-DSDS), which relies on redundancy in RF front-end capability to support carrier-aggregation (CA). In such cases, the UE may include additional diplexers and/or RF front-end hardware, to support concurrent transmission and reception on multiple frequency bands. A carrier-aggregation front-end antenna switching module (ASM) of a UE, however, may not support certain CA band combinations or groups (e.g., LTE carrier combinations), based on the carrier combinations being associated with different network operators. For example, in the People's Republic of China (PRC), the valid CA carrier combinations for China Mobile Communications Corporation (CMCC) may include B and (B) 38 (B38) and B41, or B39 and B41. In some cases, however, there may be no CA carrier requirement for B1/B3 (operated by China Unicom) and B39, since these may not be valid CA combinations supported by either of the operators. In such cases, the UE may operate a single receive chain when B1/B3 and B39 are in use. Furthermore, in some cases, the paging occasions on B1 and B9 or B3 and B39 may collide during dual-SIM LTE idle page demodulation operations.

A UE having multiple receive chains may experience paging performance degradation when operating a single receive chain in a particular frequency band or frequency band group when monitoring for pages for multiple subscriptions. In some cases, a UE operating a single receive chain may experience coverage loss and degradation in paging performance, especially in coverage limited and interference limited operating regions, such as dense urban areas. For example, in some cases, dense urban areas comprising high-rise apartments may result in penetration losses of up to 20 to 30 dB. Thus, operating in single-receive mode may adversely impact in-building coverage for UEs operating in such areas, as well as lead to more frequent paging collisions.

In accordance with the examples described herein, a UE in idle mode and operating a single receive chain in a particular frequency band or frequency band group may monitor for paging collisions and utilize additional receive chains to improve paging performance. In some cases, the UE may detect, using a first receive chain of the UE in an idle mode operating in at least one frequency band, a collision of paging messages for a first subscription and a second subscription of the UE during a paging processing duration. In some cases, the first receive chain may include at least one antenna path.

Following detection of paging collisions, the UE may proceed to determine if there are alternate antenna receive paths on one or more additional receive chains of the UE that are configured to operate in the at least one frequency band. In some cases, the UE may determine that, in a connected mode, the UE is configured to operate a second receive chain with one or more additional antenna paths in the at least one frequency band.

In an example, the UE may determine the presence of alternate antenna paths based in part on the antenna configuration of the UE, the antenna capabilities of the UE, or the RF front-end hardware/software configurations for the UE. In some cases, the UE may support Higher Order Receive Diversity (HORxD), 4×4 Multiple Input Multiple Output (MIMO), or both, in connected mode. In such cases, the UE may determine the capabilities of one or more higher order antennas associated with HORxD and 4×4 MIMO, and usually used for connected mode, for idle mode page receiving and demodulation purposes. The UE may allocate, for a subsequent instance of the paging processing duration, the first subscription to one of the first receive chain or the second receive chain, and the second subscription to the other of the first receive chain or the second receive chain. The UE may monitor, during the subsequent instance of the paging processing duration, for a first paging message and a second paging message using the first and second receive chains In some cases, the signal quality or performance for one or both of the subscriptions may be compromised on the receive chains. For example, in some cases, both the first and the second subscriptions may experience poor performance on the antenna paths associated with the first and second receive chains. In other cases, one of the first or the second subscriptions may experience poor performance on the antenna paths associated with the first or the second receive chain. In some cases, both the first and the second subscriptions may experience satisfactory performance on the antenna paths associated with the first and the second receive chains.

In some examples, the UE may employ a dynamic decision making process by estimating or calculating a performance metric for a subscription on at least one antenna path for each of the receive chains configured to operate within the at least one frequency band. In some cases, the performance metric may be one or more of a Reference Signal Received Power (RSRP), a Received Signal Strength Indicator (RSSI), a Reference Signal Received Quality (RSRQ), a Signal to Noise Ratio (SNR), or a Block Error Rate (BLER), or any other performance metric associated with a received signal. The UE may rank the antenna paths associated with each of the receive chains, for each subscription. In some instances, the UE may then allocate a subscription to at least one antenna path of a receive chain, based on, for example, the performance metrics and the ranking. For example, in some cases, the UE may determine that the performance metrics for one or both subscriptions do not satisfy a threshold for either of the antenna paths associated with a first receive chain or a second receive chain. In such cases, the UE may utilize the ranking to determine the subscription that receives the highest gain or better performing antenna. For instance, the UE may determine that both of the first subscription and the second subscription do not satisfy a threshold on any of the antenna paths associated with the first and the second receive chain. In such cases, the UE may decide to allocate the most optimally performing antenna (or antenna paths) to the subscription with the lower performance metrics. In other examples, the UE may determine that the performance metrics for one of the first or the second subscription do not satisfy a threshold. In such cases, the UE may allocate the subscription with the lower performance metrics to an antenna (or antenna path) based on the ranking (e.g., to a higher ranked antenna). Furthermore, in some cases, the UE may determine that the performance metrics for both the subscriptions satisfies the threshold on antenna paths associated with the receive chains. In such cases, the UE may allocate the first subscription to the at least one antenna path on the first receive chain and the second subscription to the at least one antenna path on the second receive chain.

Such techniques may allow for a UE to utilize one or more higher order antennas to achieve dual-receive chain concurrency during multi-SIM page demodulation.

Aspects of the disclosure are initially described in the context of a wireless communications system. Aspects of the disclosure are further illustrated by and described with respect to DRX cycle diagrams, apparatus diagrams, system diagrams, and flowcharts that relate to persistent paging collision enhancement using dynamically switched higher-order antennas in idle mode.

FIG. 1 illustrates an example of a wireless communications system 100 that supports persistent paging collision enhancement using dynamically switched higher-order antennas in idle mode in accordance with aspects of the present disclosure. The wireless communications system 100 includes base stations 105, UEs 115, and a core network 130. In some examples, the wireless communications system 100 may be a LTE, LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

The UE 115 in idle mode and operating a single receive chain in a particular frequency band or frequency band group may monitor for paging collisions and utilize additional receive chains to improve paging performance. In some instances, the UE 115 in idle may allocate subscriptions to different combinations of receive chains and a set of one or more antennas to improve paging performance.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communications device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

MIMO wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a network device, base station 105, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may include one symbol period and one subcarrier (e.g., a 15 KHz frequency range). A resource block may contain 12 consecutive subcarriers in the frequency domain and, for a normal cyclic prefix in each orthogonal frequency-division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may include one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Wireless communications system 100 illustrates aspects of persistent paging collision enhancement using dynamically switched higher order antennas in idle mode between a UE 115, a base station 105, core network 130 (e.g., a core network node), or some combination. In some examples, a UE 115 may support multiple subscriptions such as dual or multi-SIM LTE-LTE, LTE-WCDMA, or LTE-any other 3rd Generation Partnership Project (3GPP) wireless access technology.

In some cases, the UE 115 may operate in an idle mode (e.g., a DRX mode) to conserve battery life. In such cases, the UE 115 may wake-up at a specific DRX occasion within a DRX interval (e.g., based on a particular paging configuration) to monitor for potential paging messages from a corresponding subscription. In some cases, the UE 115 having multiple receive chains may operate a single receive chain when in idle mode, or may share resources for simultaneous active/idle activity related to multiple subscriptions. Each of the multiple subscriptions may be associated with one or more idle DRX wakeup occasions (or paging cycles). In some cases, the paging cycles of two or more subscriptions may collide or overlap, and the UE 115, due to operating only a single receive chain in at least one frequency band, and may accordingly monitoring pages of one wireless service and not another wireless service during the wakeup occasion. The UE 115, the base station 105, and/or other devices in idle mode may implement or more techniques described in accordance with various aspects of the present disclosure to dynamically use one or more additional receive chains and higher order antennas in the same frequency band or the same frequency band group to improve paging performance.

Figure 2:
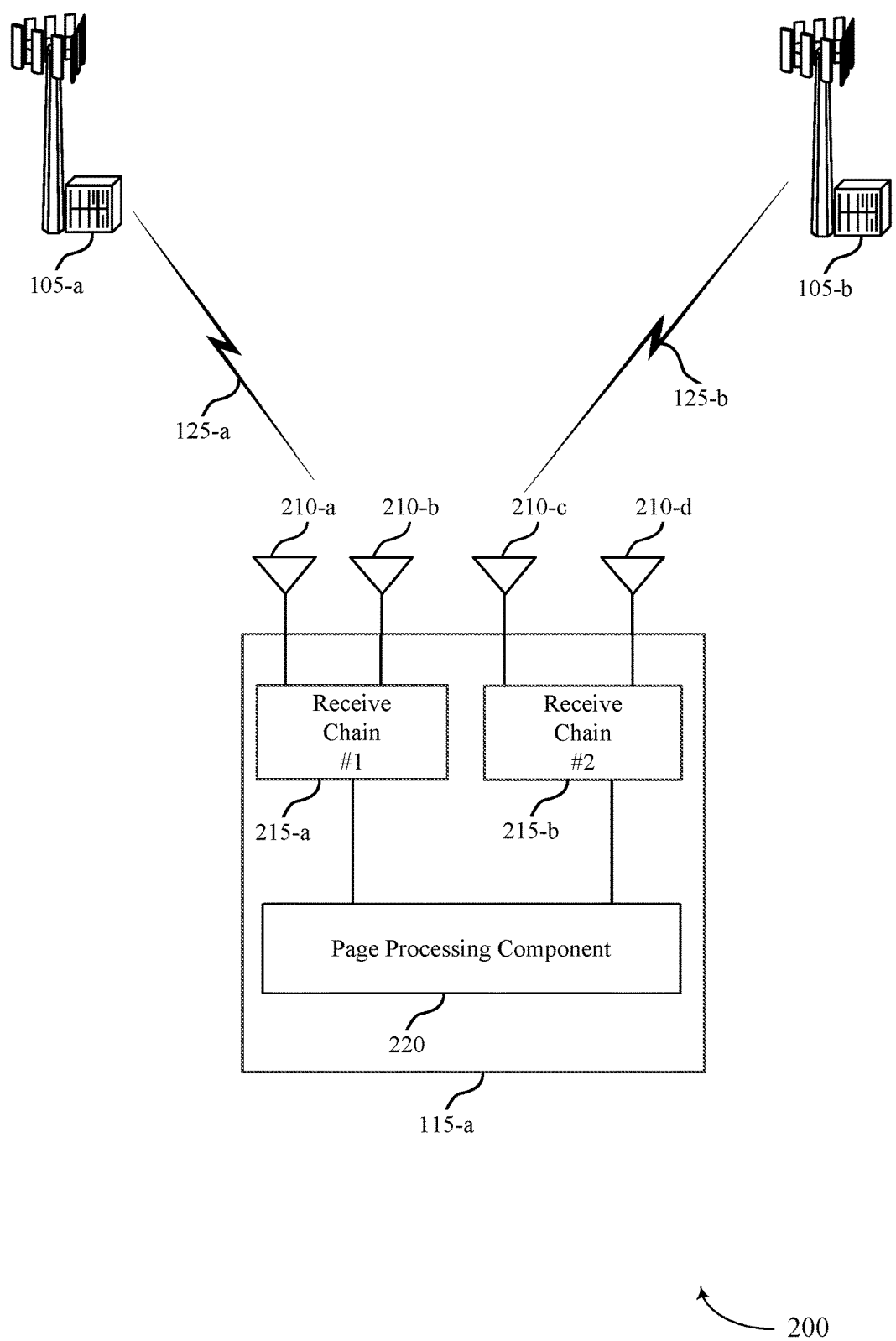
FIG. 2 illustrates an example of a wireless communications system that supports persistent paging collision enhancement using dynamically switched higher-order antennas in idle mode in accordance with aspects of the present disclosure.

FIG. 2 illustrates an example of a wireless communications system 200 that supports persistent paging collision enhancement using dynamically switched higher-order antennas in idle mode in accordance with aspects of the present disclosure. In some examples, wireless communications system 200 may implement aspects of wireless communications system 100. The wireless communications system 200 may include UE 115-a and base stations 105-a and 105-b, which may be examples of a UE 115 and base stations 105 as described with reference to FIG. 1. As shown, UE 115-a may communicate with base stations 105-a and 105-b via communication links 125-a and 125-b, respectively. UE 115-a may be associated with multiple subscriptions (i.e., may include multiple SIMs). A first base station 105-a may provide wireless service to UE 115-a for a first subscription and a second base station 105-a may provide wireless service to the UE 115-a for a second subscription. While the discussion below describes multiple base stations 105 each providing a different wireless service, a single base station 105 may provide wireless service for two or more of the subscriptions.

UE 115-a may include a set of antennas 210, two or more receive chains 215, and page processing component 220, in addition to other components. Each receive chain 215 may be associate with some or all of the antennas 210 in the set. As depicted, the UE 115-a may include multiple receive chains 215-a and 215-b and may include a set of antennas 210-a, 210-b, 210-c, and 210-d. Receive chain 215-a is associated with antennas 210-a and 210-b (e.g., a primary antenna and a diversity antenna), and receive chain 215-b is associated with antennas 210-c and 210-d (e.g., a primary antenna and a diversity antenna). A receive chain 215 may include a set of hardware components and corresponding software for wireless communication. In an example, a receive chain 215 may include one or more of a switch, a diplexer, a band switcher, a low noise amplifier, a transceiver, additional components, or any combination thereof. The switch may be used to select between which antenna, or set of antennas, is currently being used to transmit or receive by a particular receive chain 215. The diplexer may be implement frequency-domain multiplexing. The band selector may select which frequency band, or frequency band combination, is used for communication. The low noise amplifier may be electronic amplifier that amplifies a signal without significantly degrading its signal-to-noise ratio. The transceiver may be a device configured to transmit and receive communications via a wireless channel. Page processing component 220 may select which receive chain and antenna path are used for communication. An antenna path may include a particular antenna 210, or set of antennas.

Wireless communications system 200 illustrates aspects of different schemes to enable the UE 115-a in idle mode to dynamically use switched higher order antennas to enhance persistent paging collisions between base stations 105-a and 105-b. In some examples, UE 115-a may support multiple subscriptions such as multi-SIM LTE-LTE or multi-SIM LTE-WCDMA, and may operate in a DRX mode to conserve power.

In wireless communications system 200, base stations 105-a and 105-b may periodically sending a page or a paging message in one or more channels (e.g., a control channel) during a particular subframe or set of subframes, and UE 115-a, when in idle mode, may periodically wake up during a paging processing duration to monitor the one or more channels for the page. In the DRX mode, UE 115-a may periodically wake up during a paging processing duration to monitor one or more channels for a page. In some instances, a time interval in which base station 105-a sends a page for a first subscription may at least partially overlap with a time interval during which base station 105-b sends a page for a second subscription.

Figure 3:
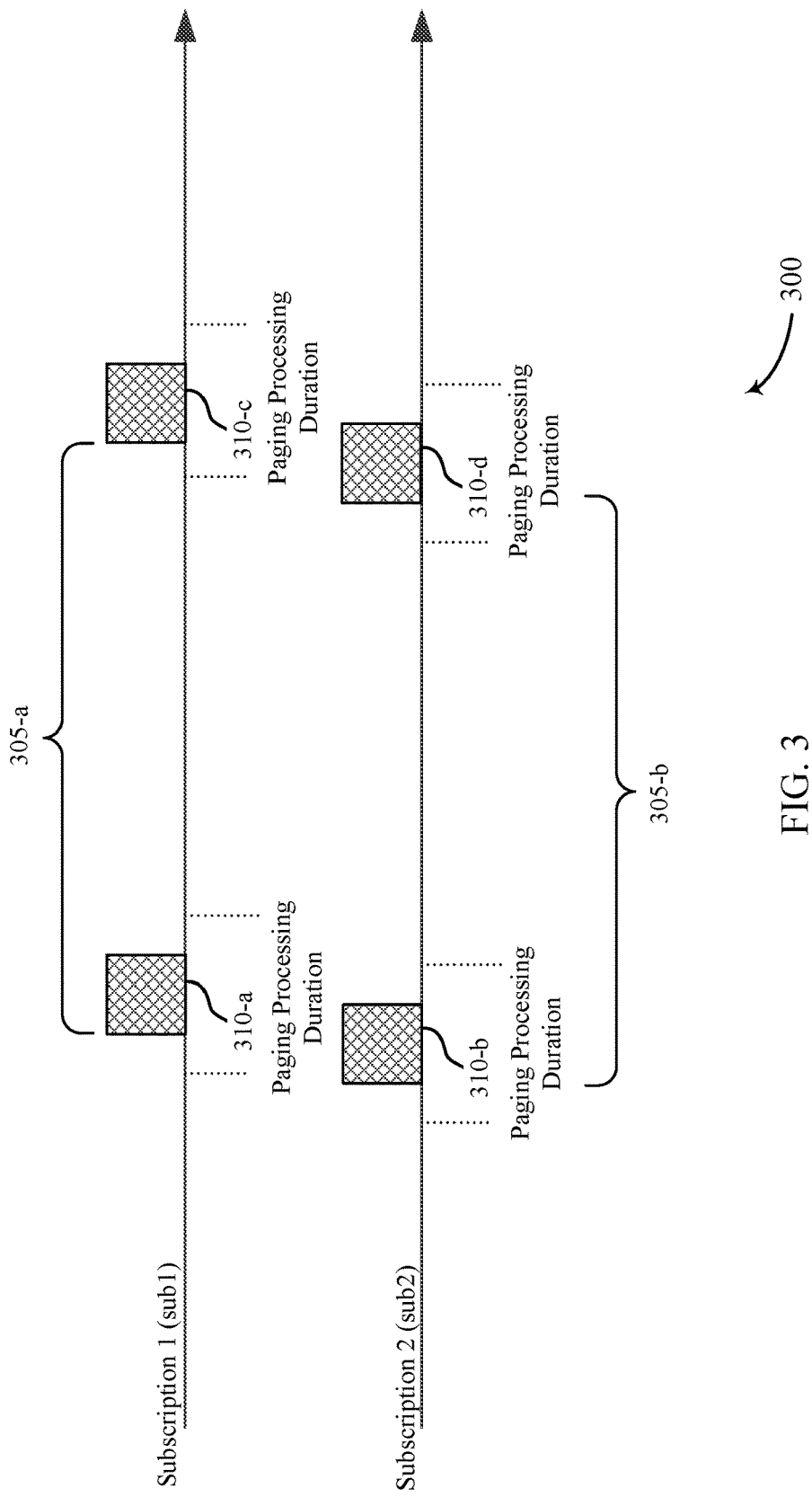
FIG. 3 illustrates an example of a paging process for a user equipment (UE) that supports persistent paging collision enhancement using dynamically switched higher-order antennas in idle mode in accordance with aspects of the present disclosure.

FIG. 3 illustrates an example of a paging process 300 for a UE 115 that supports persistent paging collision enhancement using dynamically switched higher-order antennas in idle mode in accordance with aspects of the present disclosure. Paging process 300 may include one or more DRX cycles 305 (e.g., DRX cycle 305-a and DRX cycle 305-b). In some cases, paging process may implemented by one or more the base stations 105 and UEs 115 as described with reference to FIGS. 1 and 2.

In some cases, the UE 115 may share receiving and transmitting resources for simultaneous active/idle activity for multiple subscriptions (e.g., Subscription 1 and Subscription 2) supported by the UE 115. For example, UE 115 may be an example of a dual-SIM or multi-SIM UE, and may be configured to register on multiple networks. Furthermore, each of the plurality of subscriptions may need to wake up at a specific idle DRX occasion to receive pages or paging messages from a base station 105. In some cases, the page processing durations of Subscription 1 and Subscription 2 may collide or overlap, as shown in paging collisions 310-a and 310-b. For example, a DRX cycle T may repeat in intervals of a defined number of radio frames (e.g., 32, 64, 128, 256), where nB is a function of T (e.g., nB=4T, 2T, . . . , T/32). Due to the way DRX cycles are set up, paging intervals corresponding to different subscriptions may contiguously collide with one another, or at least may partially overlap at each occurrence of the paging intervals.

Furthermore, due to limited receiving capabilities of the UE 115 (e.g., having a single receive chain), for example, the UE 115 may be capable of monitoring pages of one subscription at a given instance, thus a paging performance of Subscription 1 and Subscription 2 may be compromised. In some cases, after detecting paging collisions between Subscription 1 and Subscription 2, the UE 115 may determine an availability of alternate antenna receive paths through the use of higher order antennas (e.g., antennas used in connected mode) associated with one or more other receive chains. The UE 115 may thus enable concurrent operation in idle mode of two receive chains, each associated with a single subscription and a set of antenna paths.

In some cases, a UE 115 having multiple receive chains may operate a single receive chain in idle mode to conserve power. A single receive chain may be capable of tuning into or monitoring channels carrying paging messages for a single subscription during a DRX interval.

In some cases, for a UE 115 operating a single receive chain in an idle mode, the UE 115 may not support dual concurrent receive paths on a primary antenna and a diversity antenna, due to sharing of RF front-end components. Furthermore, each subscription may be associated with a different wakeup occasion and, in some cases, the wakeup occasions may at least partially overlap such that pages for two subscriptions may collide. In some cases, the UE 115 may operate on the same frequency band or the same frequency band group to receive wireless service corresponding to each of the subscriptions, and hence page for each of the subscriptions may be sent on the same frequency band or the same frequency band group. A same frequency band group may be a group of non-contiguous frequency bands. In some cases, paging collisions may occur due to the UE 115 in idle mode operating a single receive chain that includes hardware (e.g., an RF front-end diplexer and/or a band filter) not capable of receiving multiple pages at the same time or within an overlapping time interval. For example, the RF front end-end diplexer or band filter of the UE 115 may not be capable of supporting dual concurrent receive paths.

When connected to receive wireless service under each of the subscriptions, the UE 115 may detect whether paging collisions are occurring. The UE 115, for example, when connecting to receive service under a particular subscription, may receive signaling from a base station 105 indicating a periodically occurring time interval in which to expect to receive a page. The UE 115 may determine whether the periodically occurring time intervals at least partially overlap. In another example, the UE 115 may detect paging collisions by determining that the UE 115 has failed to receive a defined number of pages within a defined amount of time. For example, the UE 115 may expect to receive a page at periodic time intervals (e.g., every 320 milliseconds, 640 milliseconds) and may determine that a defined number of pages were not received within a defined amount of time (e.g., within preceding 5 seconds). For example, the UE 115 may determine that pages in LTE B3 received via antenna paths including multiples antennas (e.g., primary and diversity signal/antenna paths) are colliding with pages in another LTE band (e.g., LTE B40). The UE 115 may determine, using these or other techniques, that paging collisions have been detected.

Following detection of paging collisions by the UE 115, for example, due to the UE 115 in idle mode operating a single receive chain, the UE 115 may proceed to determine if there are alternate antenna receive paths on a second (or additional) receive chain 215 that operate in the same frequency band or the same frequency band group as the first receive chain. In some cases, the UE 115 may include multiple receive chains that operate in a connected mode and may determine that the UE 115 includes one or more additional receive chain and corresponding alternate antenna paths that operate in the same frequency band or the same frequency band group as the single receive chain operating in idle mode. The UE 115, for example, may process an antenna configuration of the UE 115, or the antenna capabilities of the UE 115, or the RF front-end hardware/software configurations for the UE 115, RF front-end configuration (RFC) table, the transceiver device management (TRM), or any combination thereof, to determine that the one or more additional receive chains having one or more additional antenna paths configured to operate in the same frequency band or the same frequency band group as the single receive chain operating in idle mode.

In some cases, the UE 115 may support Higher Order Receive Diversity (HORxD), 4×4 MIMO, or both, in connected mode. In such cases, the UE 115 may determine the capabilities of one or more higher order antennas each associated with HORxD or 4×4 MIMO, and usually used for connected mode. Continuing the above example, the UE 115 may determine if either B3 or B40 has an alternative receive chain to provide an RF front-end signal path and antenna-paths besides the antenna paths via one or more antennas (e.g., an alternative to main primary and diversity signal/antenna paths) such that one subscriptions may be allocated to a different receive chain and antenna path combination to allow full-concurrent dual-receive page demodulation for both B3 and B40.

Based on determining that there are one or more alternate antenna receive paths on a second (or additional) receive chain that operates in the same frequency band or the same frequency band group as the first receive chain, the UE 115 may allocate, for a subsequent instance of the paging processing duration, and additional instances, the first subscription to one of the first receive chain or the second receive chain, and the second subscription to the other of the first receive chain or the second receive chain. In some cases, the UE 115, in idle mode and during the subsequent instance of the paging processing duration and each additional instance, may concurrently operate a first receive chain and a second receive chain. During the subsequent instance of the paging processing duration, and each additional instance, the first receive chain may monitor and attempt to receive a first page corresponding to a first subscription and the second receive chain may monitor and attempt to receive a second page corresponding to a second subscription. In some examples, the UE 115 may decode one or both of the first and second pages. In some examples, the UE 115, after waking up to receive one or more pages during a paging processing duration, may enter a low power mode for a remainder of a DRX cycle and exit the low power mode during a next instance of the paging processing duration to receive pages correspond to the first and second subscriptions. Thus, by concurrently operating multiple receive chains and corresponding antenna paths, the UE 115 is configured to monitor and receive multiple pages for different subscriptions in a same frequency band or a same frequency band group in paging intervals that at least partially overlap, thereby improving paging performance.

In some cases, conditions of a wireless channel may impact paging performance. In an example, the UE 115 in idle mode may be configured to operate a first receive chain that is associated with at least one antenna path, but quality of a signal received by the receive chain via the antenna path may be poor. To improve paging performance, the UE 115 may monitor a performance metric and use the performance metric for allocating the receive chains to subscriptions for monitoring for pages during instances of the paging processing durations.

In some examples, the UE 115 may employ a dynamic decision making process by estimating or calculating a performance metric for a subscription on at least one antenna path for each of the available receive chains. In some examples, the performance metric may be one or more of a RSRP, a RSSI, a RSRQ, a SNR, or a BLER, or any other performance metric associated with a received signal. As described with reference to FIG. 2, the page processing component 220 may determine a performance metric for each receive chain for each antenna path for each subscription. For example, the page processing component 220 may determine a performance metric for wireless service for a first subscription using the first receive chain 215-a operating antenna 210-a, the performance metric for wireless service for the first subscription using the first receive chain 215-a operating antenna 210-b, the performance metric for wireless service for the first subscription using the second receive chain 215-b operating antenna 210-c, and the performance metric for wireless service for the first subscription using the second receive chain 215-a operating antenna 210-d. The page processing component 220 may also determine the performance metric for wireless service for a second subscription using the first receive chain 215-a operating antenna 210-a, the performance metric for wireless service for the second subscription using the first receive chain 215-a operating antenna 210-b, the performance metric for wireless service for a second subscription using the second receive chain 215-b operating antenna 210-c, and the performance metric for wireless service for the second subscription using the second receive chain 215-a operating antenna 210-d. The page processing component 220 may perform this same technique for any additional receive chains 215 of the UE 115. The page processing component 220 may thus have a common performance metric for each receive chain for each antenna path for each subscription.

The UE 115 may use the determined performance metrics to rank the antenna paths associated with receive chains, for each subscription. The UE 115 may then allocate a subscription to at least one antenna path of a receive chain, based in part on the performance metrics and the ranking. The UE 115 may use a performance metric threshold for determining whether to select and/or change allocation of a subscription from a particular receive chain and/or a particular antenna path.

For example, a UE 115 in idle mode may be configured to utilize a first receive chain and a first antenna to monitor and receive pages for two subscriptions. The UE 115 may determine that the performance metrics associated with the first receive chain and the first antenna for both subscriptions do not satisfy a threshold. In such case, the UE 115 may utilize the ranking to determine the highest ranked receive chain and antenna path combination and allocate one of the subscriptions to that combination, and allocate a second one of the subscriptions to the next highest ranked receive chain and antenna path combination, and so forth. In an example, the highest ranked receive chain and antenna path combination may correspond to the antenna of an available set of antennas that receives the highest gain or optimally performing antenna. For example, the UE 115 may select an LTE subscription with the lowest RSRP, the highest BLER, or the like, and assign that subscription to a receive chain and set of primary and diversity antennas (e.g., a set of antennas having a relatively higher total isotropic sensitivity (TIS)).

In some instances, the UE 115 may determine that the first subscription and the second subscription do not satisfy a threshold (e.g., determine that a RSRP is less than or equal to a threshold, or that a BLER is greater than or equal to a threshold) on any of the antenna paths associated with any of the receive chains. In such a case, the UE 115 may use the ranking to allocate a highest ranking antenna (or antenna paths) and receive chain combination to the subscription with the lower performance metric, and allocate a second one of the subscriptions to the next highest ranked receive chain and antenna path combination, and so forth. For example, the UE 115 may select an LTE subscription having poor RSRP, the high BLER, or the like, and assign that subscription to a receive chain and set of primary and diversity antennas (e.g., a set of antennas having a relatively higher TIS).

In other examples, the UE 115 may determine that the performance metrics for one of the first or the second subscription do not satisfy a threshold. In such cases, the UE 115 may allocate the subscription with the lower performance metrics to the highest antenna (or antenna path) and receive chain combination, which may or may not be already allocated to the other subscription. The subscriptions may share the highest ranked receive chain and antenna path combination, or one of the subscriptions may be allocated to the next highest ranked receive chain and antenna path combination (e.g., if paging collisions are detected). For example, the UE 115 allocate a first LTE subscription to a first receive chain and corresponding set of primary and diversity antennas, and a second LTE subscription to a second receive chain and corresponding set of primary and diversity antennas.

Further, in some cases, the UE 115 may determine that the performance metrics for both the subscriptions on their currently allocated chain and antenna path combinations satisfies the threshold. In such a case, the UE 115 may maintain allocation of the first subscription on its currently allocated at least one antenna path and receive chain combination, and maintain allocation of the second subscription on its currently allocated at least one antenna path and receive chain combination. Such techniques may allow for the UE 115 in idle mode to utilize one or more higher order antennas and receive chain to achieve dual-receive chain concurrency during multi-SIM page demodulation.

In some cases, the UE 115 may dynamically decide, using a performance metric (e.g., RSRP and BLER) to determine if coverage or page performance is poor and turn on and/or use additional antenna paths in idle mode to conserve power. Further, if performance is poor for each of multiple subscriptions, the UE 115 may rank antenna and receive chain combinations for each subscription and determine which subscription is allocated which combination. In some instances, the UE 115 may determine that a subscription associated with the worst performance metric is allocated to the highest ranked combination (e.g., is allocated the receive chain and antenna having a TIS performance per allocated power Pov). For example, the UE 115 may dynamically configure and enable an alternative antenna path using performance metric such as a filtered RSRP is below certain threshold (e.g., RSRP<−110 dBm to reflect bad coverage), a page decode error above certain threshold (e.g., >30% BLER), or the like. If the UE 115 is operating in a duress operation conditions (e.g., operating below those pre-defined thresholds for one or more performance metrics), the UE 115 may operate in a single receive chain due to persistent paging collision or if the receive chains, or other RF front-end, does not allow full concurrency on the primary and diversity receive and antenna paths within the same frequency band or frequency band group.

Figure 4:
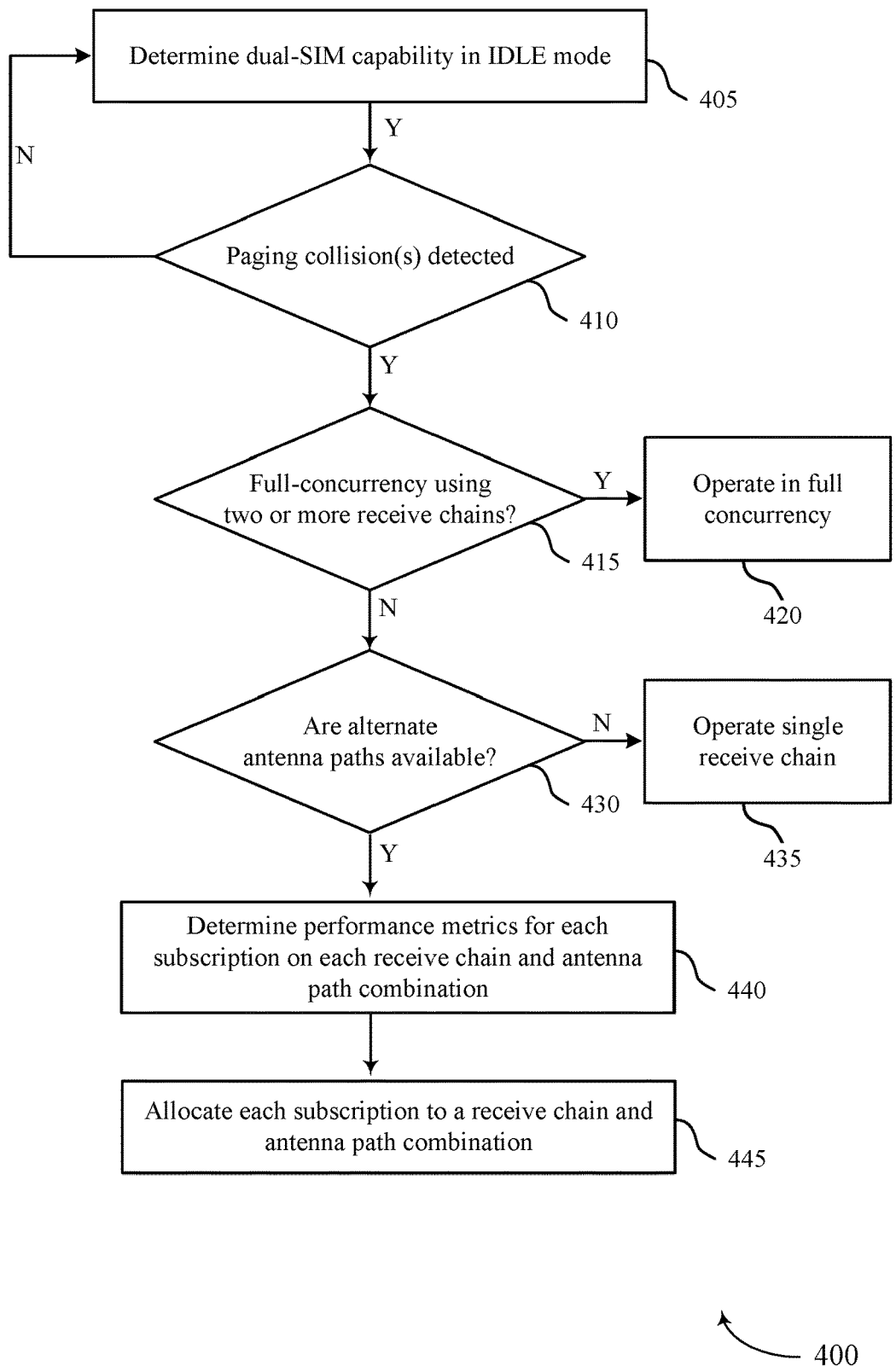
FIG. 4 illustrates an example of a flowchart for a UE that supports persistent paging collision enhancement using dynamically switched higher-order antennas in idle mode in accordance with aspects of the present disclosure.

FIG. 4 illustrates an example of a flowchart 400 for a UE 115 that supports persistent paging collision enhancement using dynamically switched higher-order antennas in idle mode in accordance with aspects of the present disclosure. The UE 115 may be an example of a UE 115 as described with reference to FIGS. 1 through 3.

At 405, the UE 115 may determine its dual or multi-SIM capability in idle mode. The UE 115 may, for example, process an antenna configuration of the UE 115, or the antenna capabilities of the UE 115, or the RF front-end hardware/software configurations for the UE 115, RFC table, the TRM, or any combination thereof.

At 410, the UE 115 may detect the presence of persistent paging collisions for a first subscription and a second subscription, for example, due to operation in a single receive chain by sharing RF front-end components, or due to the RF front-end diplexer and/or band filter capabilities of the UE 115. If no collisions are detected, the flowchart 400 may return to 405. If paging collisions are detected, the flowchart 400 may proceed to 415.

At 415, the UE 115 may determine its capability of achieving full-concurrency using two RF chains and separate antenna paths for each subscription. In some cases, the determination may be based on the antenna configuration of the UE 115, or the antenna capabilities of the UE 115, or the RF front-end hardware/software configurations for the UE 115, or the RFC table, or the TRM, or a combination thereof. If able to achieve full-concurrency, the flowchart 400 may proceed to 420. If unable, the flowchart 400 may proceed to 430.

At 420, the UE 115 may allow or enable its two subscriptions to operate in full dual-receive concurrency.

In some cases, the UE 115 may determine its incapability of achieving full dual-receive concurrency at 415. In such cases, the UE 115 may proceed to determine the presence of one or more alternative higher order antenna receive paths, as described with reference to FIGS. 2 and 3. In some cases, the UE 115 may determine that no feasible higher order antenna receive paths associated with a second receive chain are configured to operate in the same frequency band or the same frequency band combination as the first receive chain of the UE 115 operated in idle mode. In such cases, at 435, the UE 115 may continue to operate the single receive chain for both subscriptions.

In some cases, the UE 115 may determine the presence of one or more alternative higher order antenna receive paths that may be operated by an additional receive chain in the same frequency band or the same frequency band combination. In such cases, the UE 115 may determine one or more performance metrics for each subscription on at least one antenna path for each receive chain, at 440. In some cases, the process performed at 440 may be performed as described with reference to FIGS. 2 and 3.

At 445, the UE 115 may allocate each subscription to one or more antenna paths of one or more receive chains, as described with reference to FIGS. 2 and 3, and may use the allocated receive chain and antenna path combinations to monitor for paging messages associated with each of the subscriptions.

In some cases, the examples described herein may enable a dual sim UE to make use of all possible antennas, including when such a UE supports more than 2 antennas for a particular LTE band (e.g., when UE supports HORxD or 4×4 MIMO) to enable LTE+LTE idle mode full concurrency to alleviate persistent paging collision. The techniques herein may be applied in other contexts, such as LTE+WCDMA persistent page collision whereby we determine if LTE has high-order antennas for the colliding band and make use of LTE's high-order antennas to enable full-concurrent Rx for both LTE and WCDMA.

Figure 5:
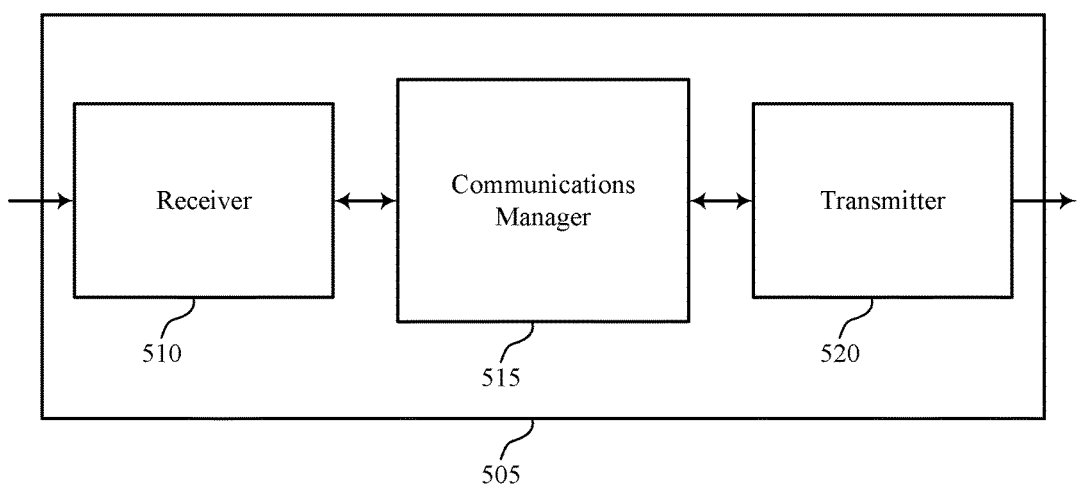
FIGS. 5 and 6 show diagrams of wireless devices that support persistent paging collision enhancement using dynamically switched higher-order antennas in idle mode in accordance with aspects of the present disclosure.

FIG. 5 shows a diagram 500 of a wireless device 505 that supports persistent paging collision enhancement using dynamically switched higher-order antennas in idle mode in accordance with aspects of the present disclosure. Wireless device 505 may be an example of aspects of a UE 115 as described herein. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to Persistent Paging Collision Enhancement Using Dynamically Switched Higher-order Antennas in Idle mode, etc.). Information may be passed on to other components of the device. The receiver 510 may be an example of aspects of the transceiver 835 as described with reference to FIG. 8. The receiver 510 may utilize a single antenna or a set of antennas.

Communications manager 515 may be an example of aspects of the communications manager 815 as described with reference to FIG. 8.

Communications manager 515 and/or at least some of its various sub-components may be implemented in hardware, software executed by a processor, firmware, or any combination thereof. If implemented in software executed by a processor, the functions of the communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 515 and/or at least some of its various sub-components may be physically located at various positions, including being distributed such that portions of functions are implemented at different physical locations by one or more physical devices. In some examples, communications manager 515 and/or at least some of its various sub-components may be a separate and distinct component in accordance with various aspects of the present disclosure. In other examples, communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 515 may detect, using a first receive chain of the UE in an idle mode operating in at least one frequency band, a collision of paging messages for a first subscription and a second subscription of the UE during a paging processing duration, the first receive chain including at least one antenna path, determine that, in a connected mode, the UE is configured to operate a second receive chain with one or more additional antenna paths in the at least one frequency band, allocate, for a subsequent instance of the paging processing duration, the first subscription to one of the first receive chain or the second receive chain, and the second subscription to the other of the first receive chain or the second receive chain, and monitor, during the subsequent instance of the paging processing duration, for a first paging message and a second paging message using the first and second receive chains.

Transmitter 520 may transmit signals generated by other components of the device. In some examples, the transmitter 520 may be collocated with a receiver 510 in a transceiver module. For example, the transmitter 520 may be an example of aspects of the transceiver 835 as described with reference to FIG. 8. The transmitter 520 may utilize a single antenna or a set of antennas.

Figure 6:
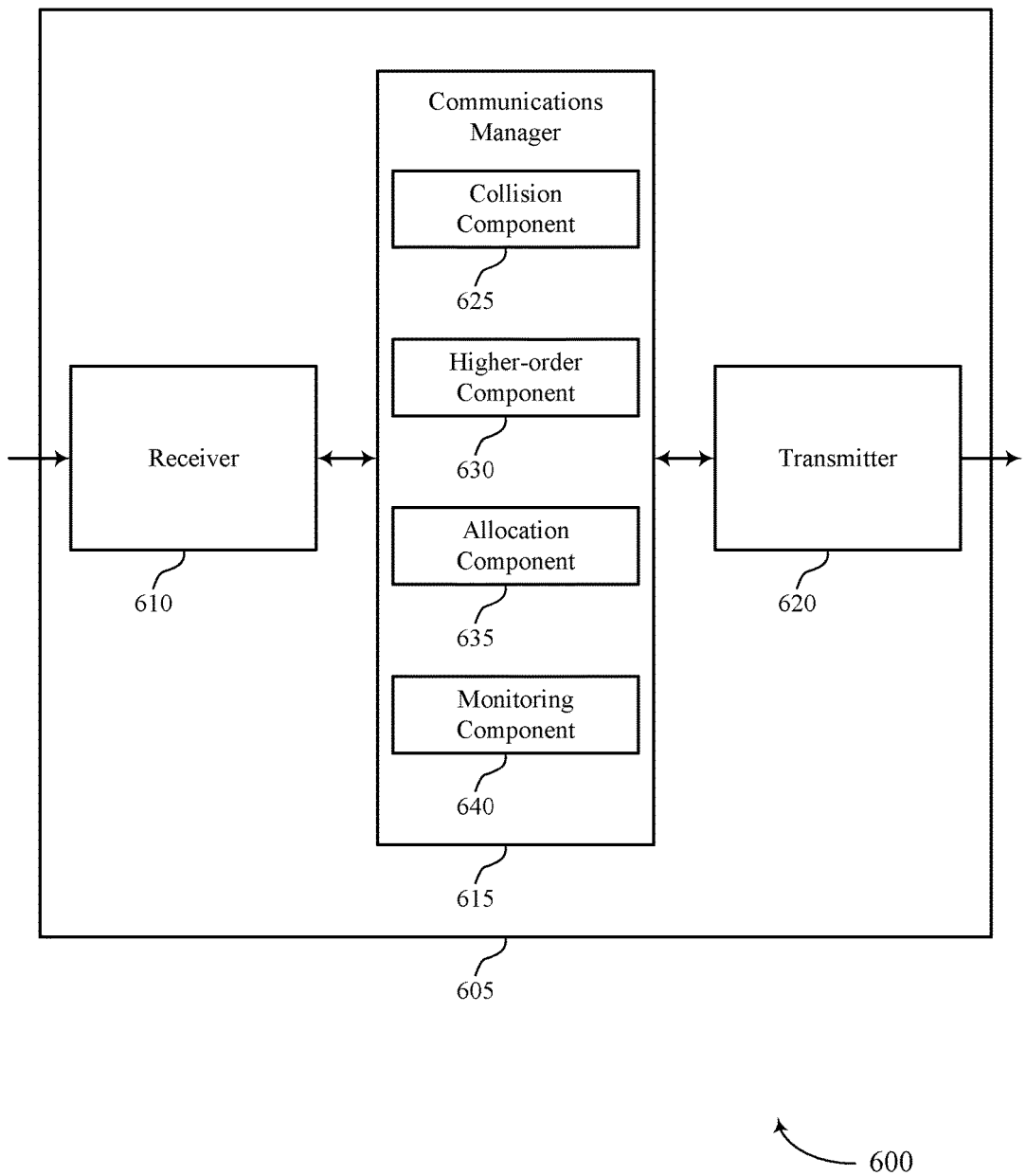

FIG. 6 shows a diagram 600 of a wireless device 605 that support persistent paging collision enhancement using dynamically switched higher-order antennas in idle mode in accordance with aspects of the present disclosure. Wireless device 605 may be an example of aspects of a wireless device 505 or a UE 115 as described with reference to FIG. 5. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to Persistent Paging Collision Enhancement Using Dynamically Switched Higher-order Antennas in Idle mode, etc.). Information may be passed on to other components of the device. The receiver 610 may be an example of aspects of the transceiver 835 as described with reference to FIG. 8. The receiver 610 may utilize a single antenna or a set of antennas.

Communications manager 615 may be an example of aspects of the communications manager 815 as described with reference to FIG. 8.

Communications manager 615 may also include collision component 625, higher-order component 630, allocation component 635, and monitoring component 640.

Collision component 625 may detect, using a first receive chain of the UE in an idle mode operating in at least one frequency band, a collision of paging messages for a first subscription and a second subscription of the UE during a paging processing duration, the first receive chain including at least one antenna path. In some cases, the detecting further includes: determining that a number of collisions of the paging messages exceeds a threshold.

Higher-order component 630 may determine that, in a connected mode, the UE is configured to operate a second receive chain with one or more additional antenna paths in the at least one frequency band. In some cases, the at least one frequency band includes a group of non-contiguous frequency bands. In some cases, the determining further includes: determining that the UE supports Higher Order Receive Diversity (HORxD), or 4×4 MIMO, or both. In some cases, the UE supports multiple subscription capabilities, and the first subscription corresponds to a first LTE subscription, and the second subscription corresponds to a second LTE subscription, a WCDMA subscription, or any other 3GPP wireless access technology. In some cases, the determining is based on an antenna configuration, antenna capability of the UE, or both.

Allocation component 635 may allocate, for a subsequent instance of the paging processing duration, the first subscription to one of the first receive chain or the second receive chain, and the second subscription to the other of the first receive chain or the second receive chain. In some cases, the allocating is based on the ranking. In some cases, the allocating is based on determining that the performance metrics for each of the antenna paths for the first receive chain or the second receive chain do not satisfy a threshold for the first subscription and the second subscription. In some cases, the allocating is based on determining that the performance metrics for each of the antenna paths for the first receive chain and the second receive chain do not satisfy a threshold for one of the first or second subscriptions. In some cases, the allocating allocates the first subscription to the at least one antenna path on the first receive chain and the second subscription to the one or more additional antenna paths on the second receive chain based on determining that each of the performance metrics satisfies a threshold.

Monitoring component 640 may monitor, during the subsequent instance of the paging processing duration, for a first paging message and a second paging message using the first and second receive chains. In some cases, the monitoring further includes: monitoring at least one antenna path of one of the first receive chain or the second receive chain allocated to the first subscription for the first paging message, and at least one antenna path of the other of the first receive chain or the second receive chain allocated to the second subscription for the second paging message. In some cases, the monitoring further includes concurrently operating the first receive chain and the second receive chain during the subsequent instance of the paging processing duration.

Transmitter 620 may transmit signals generated by other components of the device. In some examples, the transmitter 620 may be collocated with a receiver 610 in a transceiver module. For example, the transmitter 620 may be an example of aspects of the transceiver 835 as described with reference to FIG. 8. The transmitter 620 may utilize a single antenna or a set of antennas.

Figure 7:
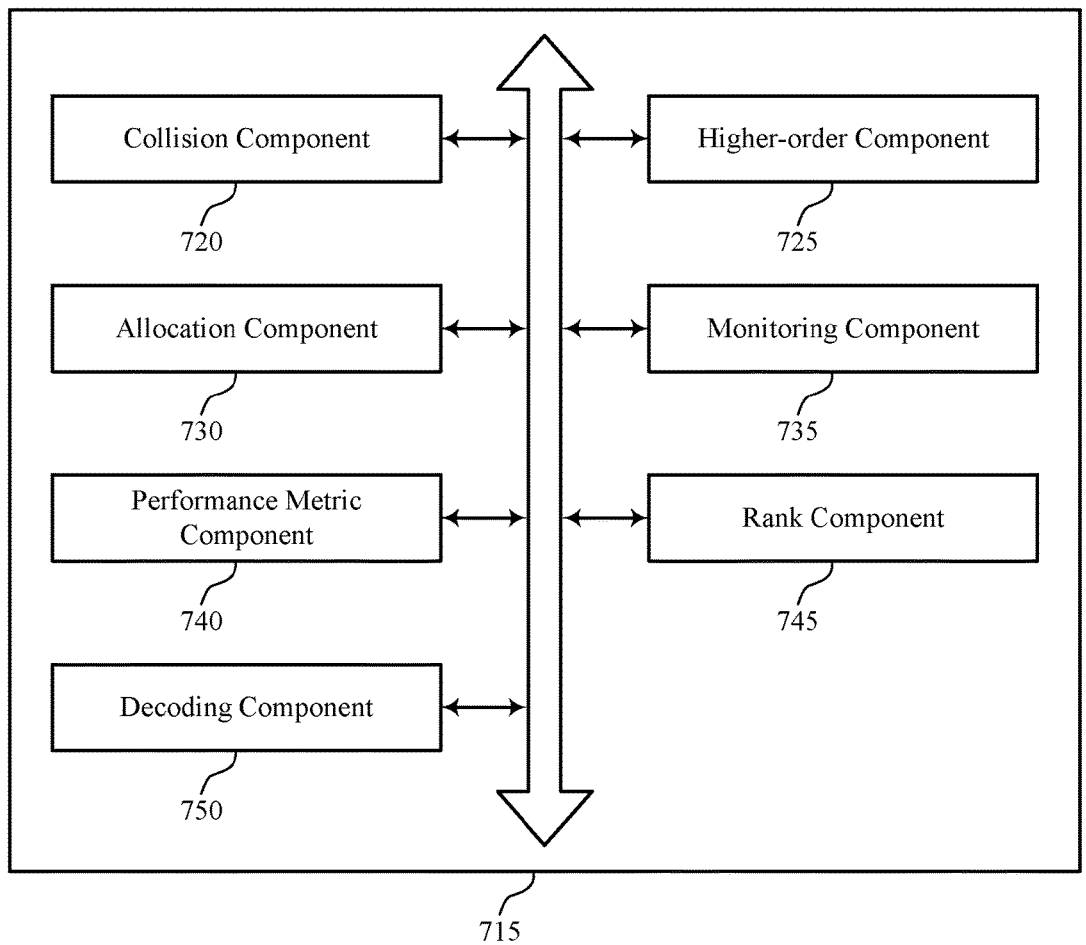
FIG. 7 shows a diagrams of a communications manager that supports persistent paging collision enhancement using dynamically switched higher-order antennas in idle mode in accordance with aspects of the present disclosure.

FIG. 7 shows a diagram 700 of a communications manager 715 that supports persistent paging collision enhancement using dynamically switched higher-order antennas in idle mode in accordance with aspects of the present disclosure. The communications manager 715 may be an example of aspects of a communications manager 515, a communications manager 615, or a communications manager 815 as described with reference to FIGS. 5, 6, and 8. The communications manager 715 may include collision component 720, higher-order component 725, allocation component 730, monitoring component 735, performance metric component 740, rank component 745, and decoding component 750. Each of these modules may communicate, directly or indirectly, with one another (e.g., via one or more buses).

Collision component 720 may detect, using a first receive chain of the UE in an idle mode operating in at least one frequency band, a collision of paging messages for a first subscription and a second subscription of the UE during a paging processing duration, the first receive chain including at least one antenna path. In some cases, the detecting further includes: determining that a number of collisions of the paging messages exceeds a threshold.

Higher-order component 725 may determine that, in a connected mode, the UE is configured to operate a second receive chain with one or more additional antenna paths in the at least one frequency band. In some cases, the at least one frequency band includes a group of non-contiguous frequency bands. In some cases, the determining further includes: determining that the UE supports Higher Order Receive Diversity (HORxD), or 4×4 MIMO, or both. In some cases, the UE supports multiple subscription capabilities, and the first subscription corresponds to a first LTE subscription, and the second subscription corresponds to a second LTE subscription, a WCDMA subscription, or any other 3GPP wireless access technology. In some cases, the determining is based on an antenna configuration, antenna capability of the UE, or both.

Allocation component 730 may allocate, for a subsequent instance of the paging processing duration, the first subscription to one of the first receive chain or the second receive chain, and the second subscription to the other of the first receive chain or the second receive chain. In some cases, the allocating is based on the ranking. In some cases, the allocating is based on determining that the performance metrics for each of the antenna paths for the first receive chain or the second receive chain do not satisfy a threshold for the first subscription and the second subscription. In some cases, the allocating is based on determining that the performance metrics for each of the antenna paths for the first receive chain and the second receive chain do not satisfy a threshold for one of the first or second subscriptions. In some cases, the allocating allocates the first subscription to the at least one antenna path on the first receive chain and the second subscription to the one or more additional antenna paths on the second receive chain based on determining that each of the performance metrics satisfies a threshold.

Monitoring component 735 may monitor, during the subsequent instance of the paging processing duration, for a first paging message and a second paging message using the first and second receive chains. In some cases, the monitoring further includes: monitoring at least one antenna path of one of the first receive chain or the second receive chain allocated to the first subscription for the first paging message, and at least one antenna path of the other of the first receive chain or the second receive chain allocated to the second subscription for the second paging message. In some cases, the monitoring further includes concurrently operating the first receive chain and the second receive chain during the subsequent instance of the paging processing duration.

Performance metric component 740 may determine a performance metric for each of the antenna paths for the first receive chain and the second receive chain, where the performance metric is one or more of a RSRP, a RSSI, a RSRQ, a SNR, or a BLER.

Rank component 745 may rank the antenna paths for the first receive chain and the second receive chain based on the determined performance metrics.

Decoding component 750 may enter a low power mode subsequent to decoding the first paging message and the second paging message and exit the low power mode during a next instance of the paging processing duration. In some cases, the monitoring further includes: decoding the first paging message and the second paging message.

Figure 8:
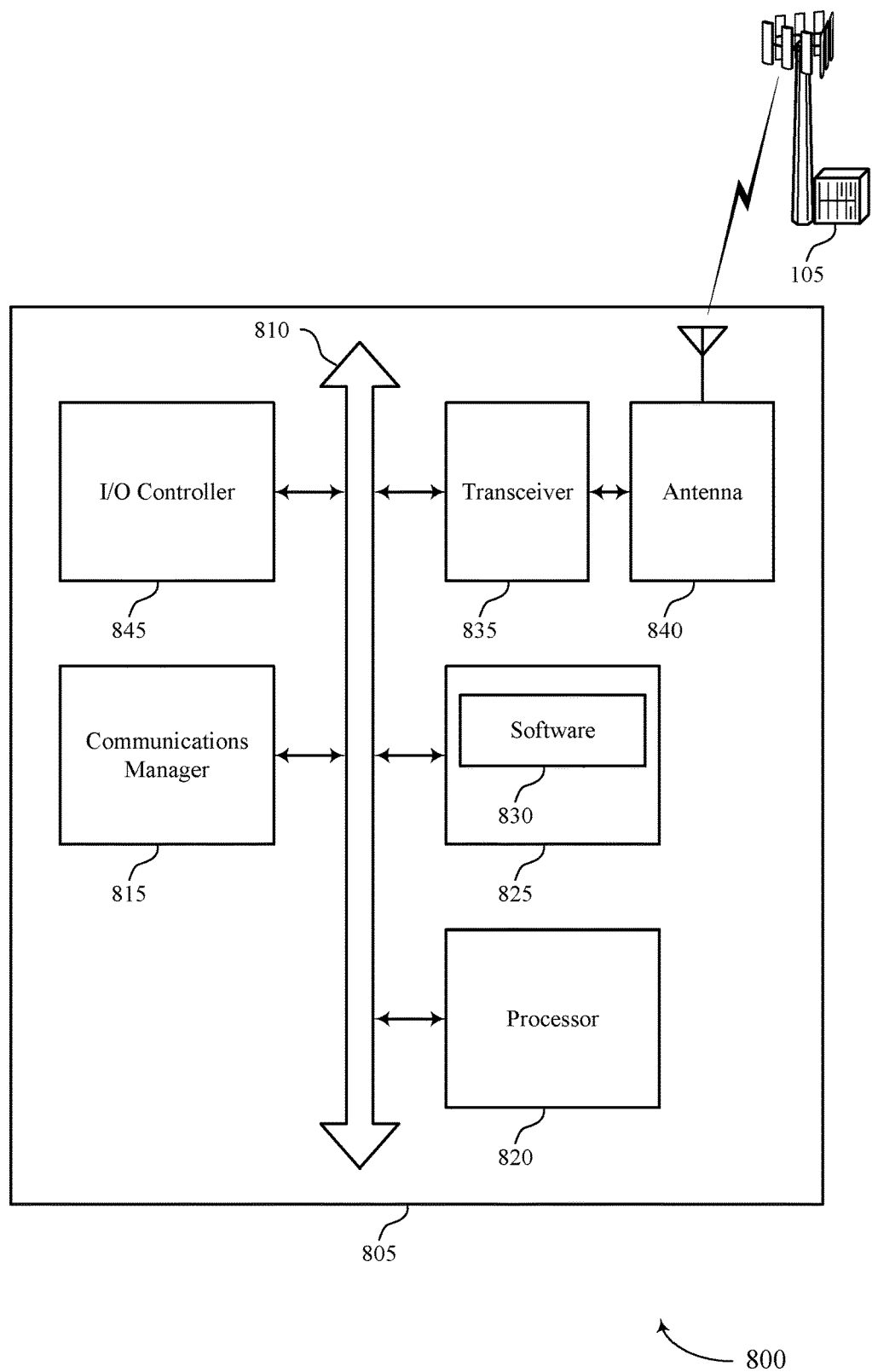
FIG. 8 illustrates a diagram of a system including a device that supports persistent paging collision enhancement using dynamically switched higher-order antennas in idle mode in accordance with aspects of the present disclosure.

FIG. 8 shows a diagram of a system 800 including a device 805 that supports persistent paging collision enhancement using dynamically switched higher-order antennas in idle mode in accordance with aspects of the present disclosure. Device 805 may be an example of or include the components of wireless device 505, wireless device 605, or a UE 115, for example, as described with reference to FIGS. 5 and 6. Device 805 may include components for bi-directional voice and data communications including components for transmitting and receiving communications, including communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting Persistent Paging Collision Enhancement Using Dynamically Switched Higher-order Antennas in Idle mode).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support Persistent Paging Collision Enhancement Using Dynamically Switched Higher-order Antennas in Idle mode. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
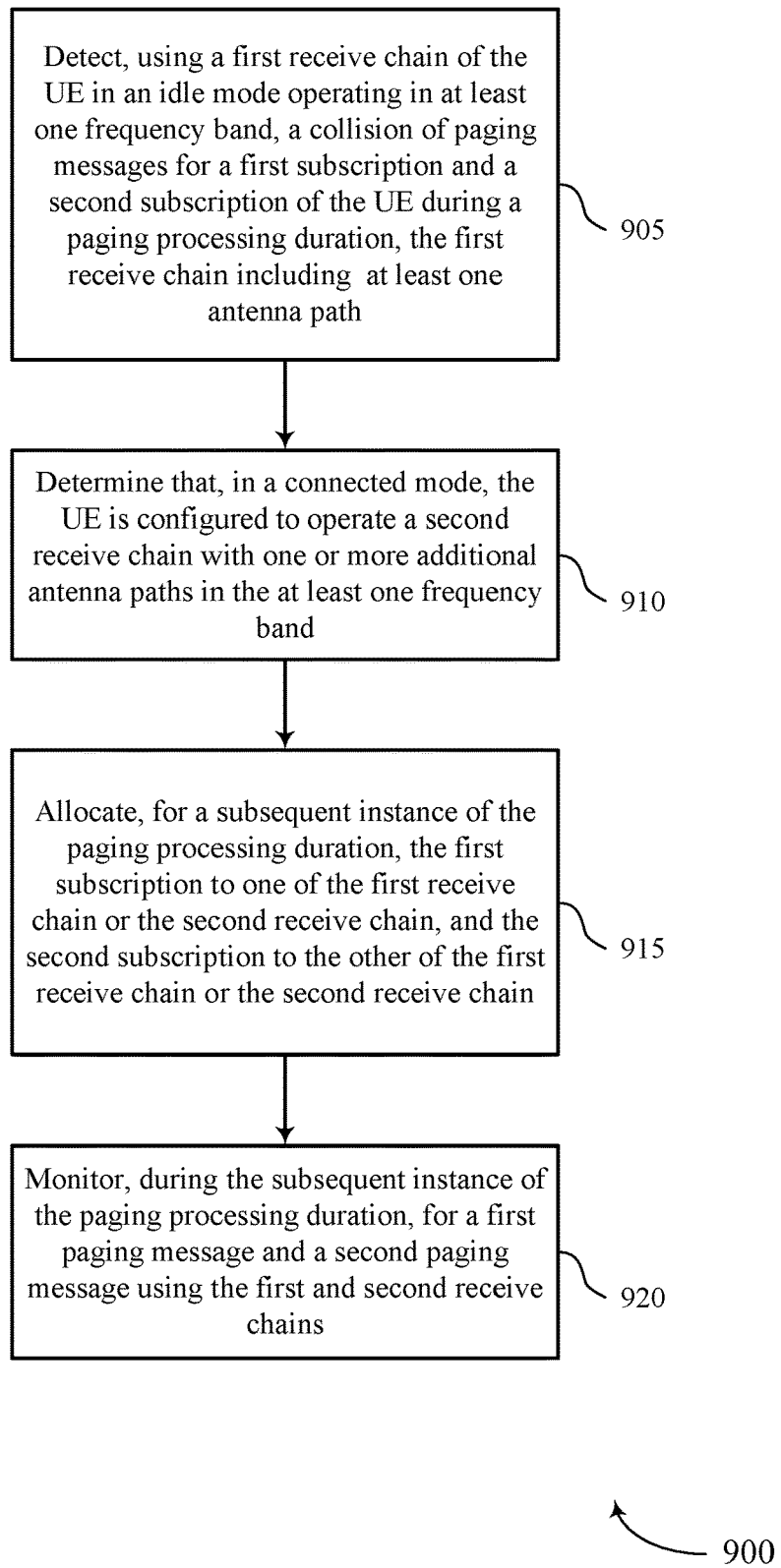
FIG. 9 shows a flowchart illustrating a method for persistent paging collision enhancement using dynamically switched higher-order antennas in idle mode in accordance with aspects of the present disclosure.

FIG. 9 shows a flowchart illustrating a method 900 for persistent paging collision enhancement using dynamically switched higher-order antennas in idle mode in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 905 the UE 115 may detect, using a first receive chain of the UE in an idle mode operating in at least one frequency band, a collision of paging messages for a first subscription and a second subscription of the UE during a paging processing duration, the first receive chain including at least one antenna path. The operations of 905 may be performed according to the methods described herein. In certain examples, aspects of the operations of 905 may be performed by a collision component as described with reference to FIGS. 5 through 8.

At 910 the UE 115 may determine that, in a connected mode, the UE is configured to operate a second receive chain with one or more additional antenna paths in the at least one frequency band. The operations of 910 may be performed according to the methods described herein. In certain examples, aspects of the operations of 910 may be performed by a higher-order component as described with reference to FIGS. 5 through 8.

At 915 the UE 115 may allocate, for a subsequent instance of the paging processing duration, the first subscription to one of the first receive chain or the second receive chain, and the second subscription to the other of the first receive chain or the second receive chain. The operations of 915 may be performed according to the methods described herein. In certain examples, aspects of the operations of 915 may be performed by an allocation component as described with reference to FIGS. 5 through 8.

At 920 the UE 115 may monitor, during the subsequent instance of the paging processing duration, for a first paging message and a second paging message using the first and second receive chains. The operations of 920 may be performed according to the methods described herein. In certain examples, aspects of the operations of 920 may be performed by a monitoring component as described with reference to FIGS. 5 through 8.

In some examples, aspects from two or more of the methods may be combined. It should be noted that the methods are just example implementations, and that the operations of the methods may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes WCDMA and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications systems 100 and 200 as described with reference to FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    detecting, at a user equipment (UE) operating in an idle mode, a collision between paging messages for a first subscription and for a second subscription of the UE, the paging messages to be received using a first receive chain of the UE during a first paging processing duration of the UE operating in the idle mode, the first receive chain including at least one antenna path configured to operate in at least one frequency band;
    determining that the UE is configured to operate a second receive chain when the UE is in a connected mode, the second receive chain including at least one additional antenna path configured to operate in the at least one frequency band;
    allocating, based at least in part on the detected collision, for a second paging processing duration of the UE operating in the idle mode, the first subscription to one of the first receive chain or the second receive chain, and the second subscription to the other of the first receive chain or the second receive chain; and
    monitoring, during the second paging processing duration, for a first paging message and a second paging message using the corresponding ones of the first receive chain and the second receive chain.

2. The method of claim 1, wherein:
    the at least one frequency band includes a group of non-contiguous frequency bands.

3. The method of claim 1, wherein the monitoring further comprises:
    monitoring at least one antenna path of one of the first receive chain or the second receive chain allocated to the first subscription for the first paging message, and at least one antenna path of the other of the first receive chain or the second receive chain allocated to the second subscription for the second paging message.

4. The method of claim 1, wherein the allocating further comprises:
    determining a performance metric for each of the antenna paths for the first receive chain and the second receive chain, wherein the performance metric is one or more of a Reference Signal Received Power (RSRP), a Received Signal Strength Indicator (RSSI), a Reference Signal Received Quality (RSRQ), a Signal to Noise Ratio (SNR), or a Block Error Rate (BLER).

5. The method of claim 4, further comprising:
    ranking the antenna paths for the first receive chain and the second receive chain based at least in part on the determined performance metrics.

6. The method of claim 5, wherein:
    the allocating is based at least in part on the ranking.

7. The method of claim 6, wherein:
    the allocating is based at least in part on determining that the performance metrics for each of the antenna paths for the first receive chain or the second receive chain do not satisfy a threshold for the first subscription and the second subscription.

8. The method of claim 6, wherein:
    the allocating is based at least in part on determining that the performance metrics for each of the antenna paths for the first receive chain and the second receive chain do not satisfy a threshold for one of the first or second subscriptions.

9. The method of claim 4, wherein:
    the allocating allocates the first subscription to the at least one antenna path on the first receive chain and the second subscription to the one or more additional antenna paths on the second receive chain based at least in part on determining that each of the performance metrics satisfies a threshold.

10. The method of claim 1, wherein the monitoring further comprises:
    decoding the first paging message and the second paging message.

11. The method of claim 10, further comprising:
    entering a low power mode subsequently to decoding the first paging message and the second paging message; and
    exiting the low power mode during a next instance of the paging processing duration.

12. The method of claim 1, wherein the monitoring further comprises:
    concurrently operating the first receive chain and the second receive chain during the second paging processing duration.

13. The method of claim 1, wherein the detecting further comprises:
    determining that a number of collisions between the paging messages exceeds a threshold.

14. The method of claim 1, wherein the determining further comprises:
    determining that the UE supports Higher Order Receive Diversity (HORxD), or 4×4 Multiple Input Multiple Output (MIMO), or both.

15. The method of claim 1, wherein:
    the UE supports multiple subscription capabilities, and the first subscription corresponds to a first Long Term Evolution (LTE) subscription, and the second subscription corresponds to a second LTE subscription, a wideband code division multiple access (WCDMA) subscription, or any other 3rd Generation Partnership Project (3GPP) wireless access technology.

16. The method of claim 1, wherein:
    the determining is based at least in part on an antenna configuration, an antenna capability of the UE, or both.

17. An apparatus for wireless communication, comprising:
    a processor;
    memory in communication with the processor; and
    instructions stored in the memory and executable by the processor to cause the apparatus to:
        detect, at a user equipment (UE) operating in an idle mode, a collision between paging messages for a first subscription and for a second subscription of the UE, the paging messages to be received using a first receive chain of the UE during a first paging processing duration of the UE operating in the idle mode, the first receive chain including at least one antenna path configured to operate in at least one frequency band;
        determine that the UE is configured to operate a second receive chain when the UE is in a connected mode, the second receive chain including at least one additional antenna path configured to operate in the at least one frequency band;
        allocate, based at least in part on the detected collision, for a second paging processing duration of the UE operating in the idle mode, the first subscription to one of the first receive chain or the second receive chain, and the second subscription to the other of the first receive chain or the second receive chain; and monitor, during the second paging processing duration, for a first paging message and a second paging message using the corresponding ones of the first receive chain and the second receive chain.

18. The apparatus of claim 17, wherein:
the at least one frequency band frequency band includes a group of non-contiguous frequency bands.

19. The apparatus of claim 17, wherein the monitoring comprises instructions further executable by the processor to:
monitor at least one antenna path of one of the first receive chain or the second receive chain allocated to the first subscription for the first paging message, and at least one antenna path of the other of the first receive chain or the second receive chain allocated to the second subscription for the second paging message.

20. The apparatus of claim 17, wherein the allocating comprises instructions further executable by the processor to:
determine a performance metric for each of the antenna paths for the first receive chain and the second receive chain, wherein the performance metric is one or more of a Reference Signal Received Power (RSRP), a Received Signal Strength Indicator (RSSI), a Reference Signal Received Quality (RSRQ), a Signal to Noise Ratio (SNR), or a Block Error Rate (BLER).

21. The apparatus of claim 20, wherein the instructions are further executable by the processor to:
rank the antenna paths for the first receive chain and the second receive chain based at least in part on the determined performance metrics.

22. The apparatus of claim 21, wherein:
the allocating is based at least in part on the ranking.

23. The apparatus of claim 22, wherein:
the allocating is based at least in part on determining that the performance metrics for each of the antenna paths for the first receive chain and the second receive chain do not satisfy a threshold for one of the first or second subscriptions.

24. The apparatus of claim 20, wherein:
the allocating allocates the first subscription to the at least one antenna path on the first receive chain and the second subscription to the one or more additional antenna paths on the second receive chain based at least in part on determining that each of the performance metrics satisfies a threshold.

25. The apparatus of claim 17, wherein the monitoring comprises instructions further executable by the processor to:
decode the first paging message and the second paging message;
enter a low power mode subsequently to decoding the first paging message and the second paging message; and
exit the low power mode during a next instance of the paging processing duration.

26. The apparatus of claim 17, wherein the monitoring comprises instructions further executable by the processor to:
concurrently operate the first receive chain and the second receive chain during the second paging processing duration.

27. The apparatus of claim 17, wherein the detecting comprises instructions further executable by the processor to:
determine that a number of collisions between the paging messages exceeds a threshold.

28. The apparatus of claim 17, wherein:
the UE supports multiple subscription capabilities, and the first subscription corresponds to a first Long Term Evolution (LTE) subscription, and the second subscription corresponds to a second LTE subscription, a wideband code division multiple access (WCDMA) subscription, or any other 3rd Generation Partnership Project (3GPP) wireless access technology.

29. An apparatus for wireless communication, comprising:
means for detecting, at a user equipment (UE) operating in an idle mode, a collision between paging messages for a first subscription and for a second subscription of the UE, the paging messages to be received using a first receive chain of the UE during a first paging processing duration of the UE operating in the idle mode, the first receive chain including at least one antenna path configured to operate in at least one frequency band;
means for determining that the UE is configured to operate a second receive chain when the UE is in a connected mode, the second receive chain including at least one additional antenna path configured to operate in the at least one frequency band;
means for allocating, based at least in part on the detected collision, for a second paging processing duration of the UE operating in the idle mode, the first subscription to one of the first receive chain or the second receive chain, and the second subscription to the other of the first receive chain or the second receive chain; and
means for monitoring, during the second paging processing duration, for a first paging message and a second paging message using the corresponding ones of the first receive chain and the second receive chain.

30. A non-transitory computer-readable medium storing code for wireless communications, the code comprising instructions executable to:
detect, at a user equipment (UE) operating in an idle mode, a collision between paging messages for a first subscription and for a second subscription of the UE, the paging messages to be received using a first receive chain of the UE during a first paging processing duration of the UE operating in the idle mode, the first receive chain including at least one antenna path configured to operate in at least one frequency band;
determine that the UE is configured to operate a second receive chain when the UE is in a connected mode, the second receive chain including at least one additional antenna path configured to operate in the at least one frequency band;
allocate, based at least in part on the detected collision, for a second paging processing duration of the UE operating in the idle mode, the first subscription to one of the first receive chain or the second receive chain, and the second subscription to the other of the first receive chain or the second receive chain; and
monitor, during the second paging processing duration, for a first paging message and a second paging message using the corresponding ones of the first receive chain and the second receive chain.

* * * * *